United States Patent
Nor et al.

(10) Patent No.: US 10,740,119 B2
(45) Date of Patent: Aug. 11, 2020

(54) IDENTIFYING A COMMON ACTION FLOW

(71) Applicant: EntIT Software LLC, Sunnyvale, CA (US)

(72) Inventors: Igor Nor, Haifa (IL); Eyal Kenigsberg, Dolev (IL); Ola Galkin, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 288 days.

(21) Appl. No.: 15/655,726

(22) Filed: Jul. 20, 2017

(65) Prior Publication Data

US 2017/0315822 A1 Nov. 2, 2017

Related U.S. Application Data

(63) Continuation of application No. 14/098,188, filed on Dec. 5, 2013, now Pat. No. 9,753,743.

(51) Int. Cl.
*G06F 9/44* (2018.01)
*G06F 9/451* (2018.01)
*G06F 11/30* (2006.01)
*G06F 11/34* (2006.01)

(52) U.S. Cl.
CPC ............ *G06F 9/451* (2018.02); *G06F 11/30* (2013.01); *G06F 11/3003* (2013.01); *G06F 11/3438* (2013.01); *G06F 11/3452* (2013.01); *G06F 2201/81* (2013.01); *G06F 2201/865* (2013.01); *G06F 2201/88* (2013.01)

(58) Field of Classification Search
CPC ........... G06F 2201/81; G06F 2201/865; G06F 2201/88; G06F 3/0482
See application file for complete search history.

(56) References Cited

U.S. PATENT DOCUMENTS

| | | | |
|---|---|---|---|
| 6,957,390 B2 | 10/2005 | Tamir et al. | |
| 9,224,394 B2* | 12/2015 | Schalk | .................... G10L 15/22 |
| 2002/0118220 A1 | 8/2002 | Lui et al. | |
| 2002/0184575 A1 | 12/2002 | Landan | |
| 2003/0001894 A1* | 1/2003 | Boykin | ................. G06F 3/0481 |
| | | | 715/764 |
| 2004/0205704 A1 | 10/2004 | Miller et al. | |

(Continued)

OTHER PUBLICATIONS

Agrawal et al; Fast Algorithms for Mining Association Rules; IBM Almaden Research Center; http://www.cse.msu.edu/~cse960/Papers/MiningAssoc-AgrawalAS-VLDB94.pdf; 1994; 13 pages.

(Continued)

*Primary Examiner* — Anil K Bhargava

(57) ABSTRACT

A common action flow for an application is identified by processing session data maintained for a plurality of users to identify a plurality of action flows. Each action flow represents a series of actions taken by one of the users navigating the application's user interface during a session. A data structure is generated from the plurality of action flows. That data structure is indicative of a plurality of candidate sub-flows. The data structure is analyzed to identify a selected one of the candidate sub-flows repeated in multiple ones of the plurality of action flows. That identified sub-flow is the common action flow. Data representative of the identified common action flow can then be communicated.

20 Claims, 3 Drawing Sheets

(56) References Cited

U.S. PATENT DOCUMENTS

| | | | |
|---|---|---|---|
| 2007/0294624 A1* | 12/2007 | Singh .................. | G06F 9/44505 |
| | | | 715/747 |
| 2009/0103828 A1* | 4/2009 | Shibukawa ........ | G06K 9/00973 |
| | | | 382/260 |
| 2012/0210209 A1 | 8/2012 | Biddle | |
| 2013/0086510 A1* | 4/2013 | Lee ...................... | G06F 3/0482 |
| | | | 715/781 |
| 2013/0167113 A1* | 6/2013 | Mahmud ............ | G06F 11/3672 |
| | | | 717/120 |

OTHER PUBLICATIONS

Croll, Alistair et al., Could They Do It?: Real User Monitoring: Chapter 10—Complete Web Monitoring, 2013, 28 pages, http://oreilly.com/web-development/excerpts/9780596155131/chapter-10.html.

Google Analytics Solutions; Introducing Flow Visualization: visualizing visitor flow ; https://analytics.googleblog.com/2011/10/introducing-flow-visualization.html; Oct. 19, 2011; 9 pages.

VanDerAalst, et al; Workflow mining: A survey of issues and approaches; Department of Technology Management, Eindhoven University of Technology; http://mlsurveys.s3.amazonaws.com/37.pdf; accepted Feb. 26, 2003; 31 pages.

Wikepedia; NP (Complexity); https://en.wikipedia.org/wiki/NP_(complexity); Jan. 28, 2017; 7 pages.

\* cited by examiner

IDENTIFYING A COMMON ACTION FLOW

CLAIM FOR PRIORITY

The present application is a Continuation of commonly assigned and co-pending U.S. patent application Ser. No. 14/098,188, filed Dec. 5, 2013, entitled "IDENTIFYING A COMMON ACTION FLOW," the disclosure of which is hereby incorporated by reference in its entirety.

BACKGROUND

Users interact with an application via a user interface through which the users can each take a series of actions in an attempt to achieve a desired goal. For example, a user may navigate a shopping website to identify, select, and then purchase an item. In another example, a user may navigate user interface for a service desk application to report a problem, browse through a list of suggested solutions, and select a solution from the list.

DRAWINGS

DETAILED DESCRIPTION

Introduction

Users interact with an application via a user interface through which each user instigates a series of actions in an attempt to achieve a desired result. Those actions can include interacting with controls to select parameters and to pass instructions to the application. The sequence of actions taken by a user can be referred to as an action flow. To identify a strategy for improving application performance it is helpful to develop an understanding of common action flows.

Such user behavior data is helpful for testing purposes. Applications can be tested using scripts, each simulating typical behavior of a given user. Scenarios composed from several scripts can cover main action flows real users will likely execute on the application during production. Embodiments described below function to identify common action flows of real users that can be used for to generate scripts for testing the application. In an example, session data representing user interactions with an application is maintained. The session data is processed to identify a number of action flows. Each action flow represents a series of actions taken by a user navigating the application's user interface. A sub-flow of actions common to a number of the action flows is then discovered. The discovered sub-flow is identified as a common action flow or a micro-process. Data representative of the identified sub-flow can then be communicated for use in generating a script for testing the application.

Identified common action flows can be used for other purposes as well. For example, analysis of the flows may reveal that a business process can be sped up by condensing multiple common actions into a single step. Analysis may reveal that users are getting stuck at a particular point in the application and not completing an intended task. Analysis may also reveal that certain application features are being utilized more than others. Of course there are many other use cases.

The following description is broken into sections. The first, labeled "Components," describes examples of various physical and logical components for implementing various embodiments. The second section, labeled "Operation," describes steps taken to implement various embodiments.

Figure 1:
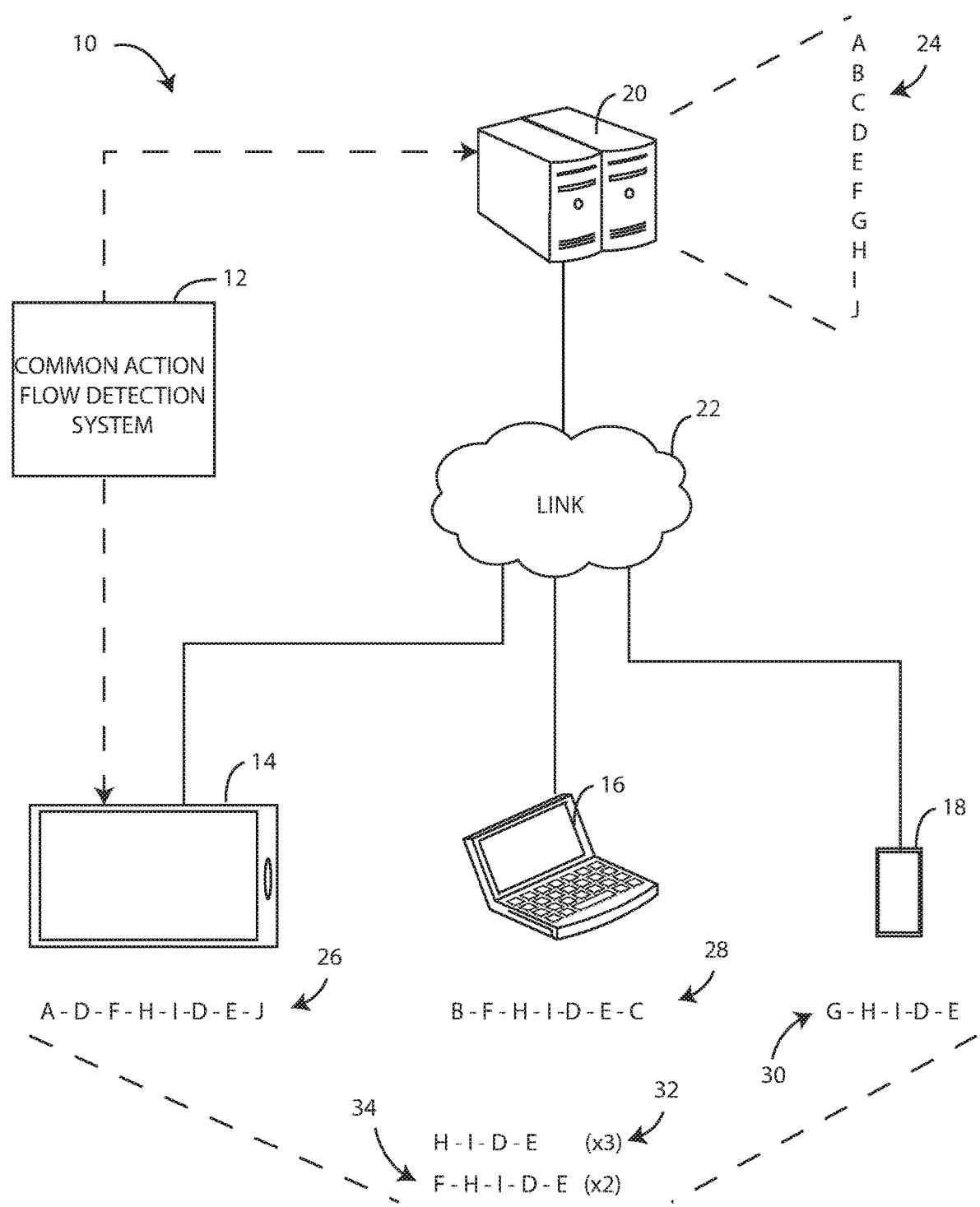
FIG. 1 is a block diagram depicting an example setting in which various embodiments may be implemented.

Components:

FIG. 1 depicts an example environment 10 in which embodiments may be implemented as common action flow detection system 12. Environment 10 is shown to include client devices 14, 16, 18 and server device 20. Each client device 14-18 represents a computing device configured to communicate requests to and receive responses from server device 20. Server device 20 represents a computing device capable of receiving and responding to requests from client devices 14-18. Components 14-20 are interconnected via link 22. Link 22 represents generally any infrastructure or combination of infrastructures configured to enable electronic communication between components 14-20. For example, link 22 may represent the internet, one or more intranets, and any intermediate routers, switches, and other interfaces.

Server device 20, for example, may serve an application for consumption by client devices 14-18. Users of client deices 14-18 interact with that application via a user interface. Through that user interface, those users can initiate a number of actions. For example, the users can interact with a number of graphical controls including text boxes, radio buttons, command buttons, links, and the like. In this example there are ten actions 24 represented as letters A-J.

Users of client devices 14-18 may navigate application differently, each generating a different action flow selected from actions 24. Where, for example, server device 20 serves a photo editing application, different users may utilize different photo editing features. Where server 20 serves an ecommerce application, different users may order different products or services. In the example of FIG. 1, user of client device interacted with the appellation using action sequence 26. Likewise, users of client devices 16 and 18 interacted with the application using sequences 28 and 30. Action sequences 26-30 each represent a series of actions initiated by a user during a corresponding application session. Analyzing action sequences 26-30, common action flows 32 and 34 appear. The term common is used to indicate that a given action flow has been repeated two or more times. Common action flow 32, in this example, is repeated three times, while common action flow 34 is repeated twice. Further analysis will reveals that common action flow 34 is an extension of common action flow 32. In other words, common action flow appears within common action flow 34.

Common action flow detection system 12, discussed in more detail below, represents generally a combination of hardware and programming configured to analyze action sequences for each of a plurality of users to identify common action flows. The identified common action flows can then be used in a number of manners including generating test scripts for simulating common user behaviors. System 12 may be integrated within one or all of client devices 14-18. System 12 may be integrated in server device 20 or another server device not shown. System 12 may be distributed across server device 20 and client devices 14-18.

Figure 2:
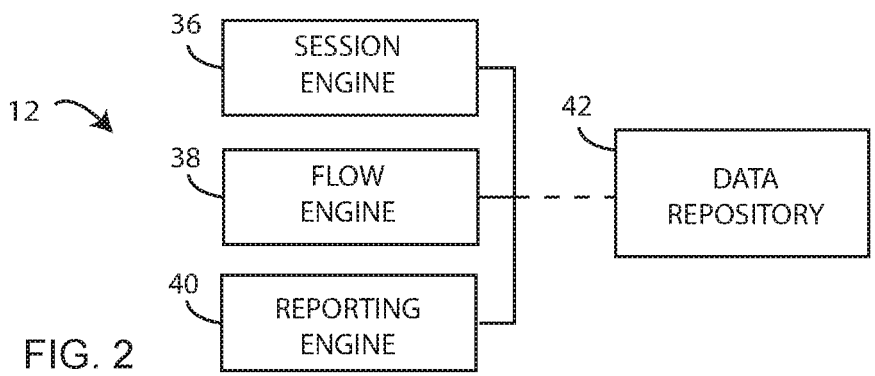
FIG. 2 is a block diagram depicting an example of a system for identifying a common user flow.
Figure 3:
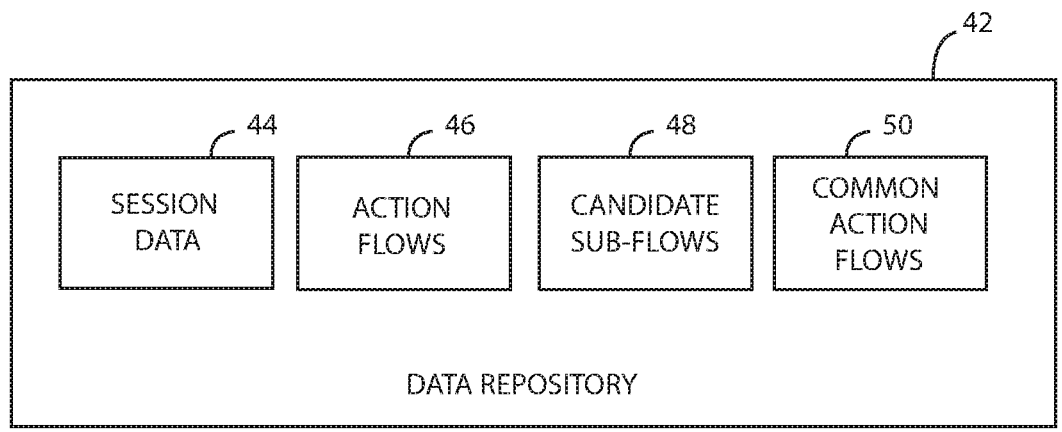
FIG. 3 is a block diagram depicting an example data structure for maintaining session data.
Figure 4:
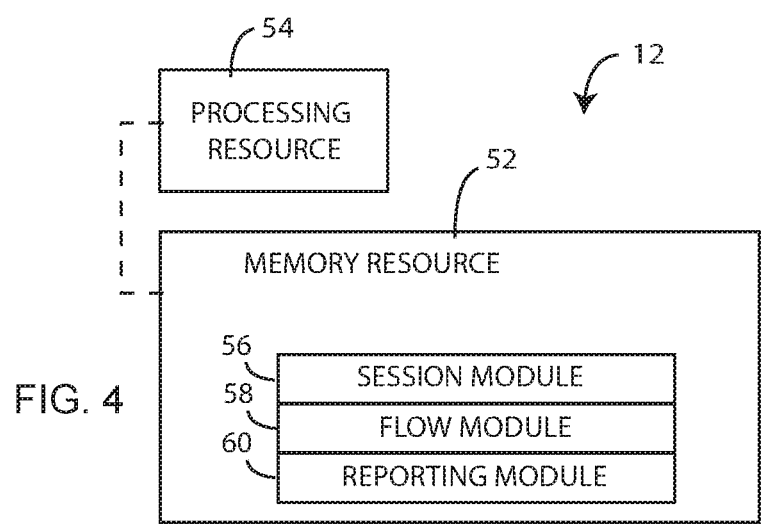
FIG. 4 is a block diagram depicting a memory resource and a processing resource according to an example.

FIGS. 2-4 depict examples of physical and logical components for implementing various embodiments. In FIG. 2 various components are identified as engines 36-40. In describing engines 36-40, focus is on each engine's designated function. However, the term engine, as used herein, refers to a combination of hardware and programming configured to perform a designated function. As is illustrated later with respect to FIG. 4, the hardware of each engine, for example, may include one or both of a processor and a memory device, while the programming is code stored on that memory device and executable by the processor to perform the designated function.

FIG. 2 is a block diagram depicting components of common action flow detection system 12. In this example, system 12 includes session engine 36, flow engine 38, and reporting engine 40. In performing their respective functions, engines 36-40 may access data repository 42. Repository 42 represents generally any memory accessible to system 12 that can be used to store and retrieve data.

Session engine 36 is configured to process session data to identify, for an application, a plurality of action flows. The session data reflects, for each application session, a corresponding user's interactions with the application's user interface. In operation session engine 36 processes the session data to identify, for each application session, the sequence of actions initiated by a corresponding user. Session engine 36 may limit its activity to a particular time frame or to a particular set of users. Looking back to FIG. 1, session engine 36 would analyze session data for the application served by server device 22 to identify action flows 26-30.

Flow engine 38 is configured to identify a sub-flow of actions repeated in the plurality of action flows identified by session engine 36. The identified sub-flow represents a common action flow repeated in two or more application sessions. Flow engine 38 examines the plurality of identified action flows to identify a set of candidate sub-flows. Each candidate sub-flow represents a unique consecutive sequence of actions taken during an application session. For example, where A>B>C>D represents an action flow with each letter representing an action, the candidate sub-action flows would include A>B>C>D, A>B>C, B>C>D, A>B, B>C, and C>D. Once the candidate sub-flows are identified for each of the plurality of action flows, it is expected that duplicate candidate sub-flows will appear.

Flow engine 38 then filters the candidate sub-action flows according to a rule such that the sub-flow of actions representing the common action flow remains. The rule may specify flow length such that candidate sub-flows shorter than the specified length are removed from consideration. The rule may specify a repetition count such that candidate consecutive sub-flows repeated less than the repetition count are removed from consideration.

In performing its function, flow engine 38 may use a set of strings each representing one of the plurality of action flows, to generate a generalized suffix tree data structure. Each suffix in the tree represents a different sub-flow of actions included in the identified plurality of action flows. Thus, each suffix (referred to as a suffix sub-flow) represents a candidate sub-flow of actions. Again, candidate sub-flows shorter than a predetermined length and sub-flows repeated less than a prescribed number of times may be filtered out.

In an example, flow engine 38 can identify the common action flow by discovering a plurality of suffix sub-flows and then identifying one of the suffix sub-flows that satisfies a rule. Those suffix sub-flows may appear, for example, in a generalized suffix tree assembled from strings representing the plurality of action flows identified by session engine 36. Flow engine 38 may identify a one of the suffix sub-flows that satisfies the rule by filtering the discovered suffix sub-flows according at least one of a threshold repetition count and a threshold flow length to reveal a given suffix sub-flow. Flow engine 38 can then examine the discovered suffix sub-flows for an extension of the given suffix sub-flow. An extension is a suffix sub-flow that contains the given suffix sub-flow. For example, flow engine 38 may identify the given suffix sub-flow represented by A>B>C. The suffix-sub-flow W>A>B>C>Q is an extension of that given suffix sub-flow. Flow engine 38 can then identify one or both of the given suffix sub-flow and its extension as a sub-flow of actions representing the common action flow.

Reporting engine 40 is configured to communicate data representative of the common action flow identified by flow engine 38. Such data may be communicated in any of a number of fashions including an electronic message such as an email, causing a display of a graphical representation of the common action flow on a screen, as well as storing data indicative of the common action flow in a data repository such as repository 42.

In the discussion above, the action flows identified by the session engine 36 represent flows of consecutive actions. It may be beneficial in some cases to also identify flows that appear in the same order across a number of sessions but may be interrupted, within any given session, by other actions. Thus, session engine 36 is configured to filter the identified plurality of action flows to include only the actions in a set of statistically related actions. The statistical set may be manually or automatically generated. Flow engine 38 then preforms its functions as describe above using the filtered plurality of action flows to identify a common action flow. However, in this case, the common action flow is a non-consecutive flow of actions.

FIG. 3 depicts an example implementation of data repository 42. While shown as unified, repository 42 may be distributed across any number of memory devices. In this example, repository 42 includes session data 44, action flows 46, candidate sub-flows 48, and common action flows 50. Session data 44 represents, for each application session, a given user's interactions with the application. Session engine 36 analyzes session data 36 to identify the plurality of action flows stored as action flows 46. Flow engine 38 then processes action flows 46 to identify the candidate sub-flows 46 and ultimately identifies and stores common action flow 50.

In foregoing discussion, engines 36-28 were described as combinations of hardware and programming. Engines 36-28 may be implemented in a number of fashions. Looking at FIG. 4, the programming may be processor executable instructions stored on tangible memory resource 52 and the hardware may include processing resource 54 for executing those instructions. Thus memory resource 52 can be said to store program instructions that when executed by processing resource 54 implements system 12 of FIG. 2.

Memory resource 52 represents generally any number of memory components capable of storing instructions that can be executed by processing resource 54. Memory resource 52 is non-transitory in the sense that it does not encompass a transitory signal but instead is made up of more or more memory components configured to store the relevant instructions. Memory resource 52 may be implemented in a single device or distributed across devices. Likewise, processing resource 54 represents any number of processors capable of executing instructions stored by memory resource 54. Processing resource 54 may be integrated in a single device or distributed across devices. Further, memory resource 52 may be fully or partially integrated in the same device as processing resource 54, or it may be separate but accessible to that device and processing resource 54.

In one example, the program instructions can be part of an installation package that when installed can be executed by processing resource 54 to implement system 12. In this case, memory resource 52 may be a portable medium such as a CD, DVD, or flash drive or a memory maintained by a server from which the installation package can be downloaded and installed. In another example, the program instructions may be part of an application or applications already installed. Here, memory resource 52 can include integrated memory such as a hard drive, solid state drive, or the like.

In FIG. 4, the executable program instructions stored in memory resource 52 are depicted as session module 56, flow module 46, and reporting module 60. Session module 56 represents program instructions that when executed cause processing resource 54 to implement session engine 36 of FIG. 2. Flow module 58 represents program instructions that when executed cause the implementation of flow engine 38. Likewise, reporting module 60 represents program instructions that when executed cause the implementation of reporting engine 60.

Figure 5:
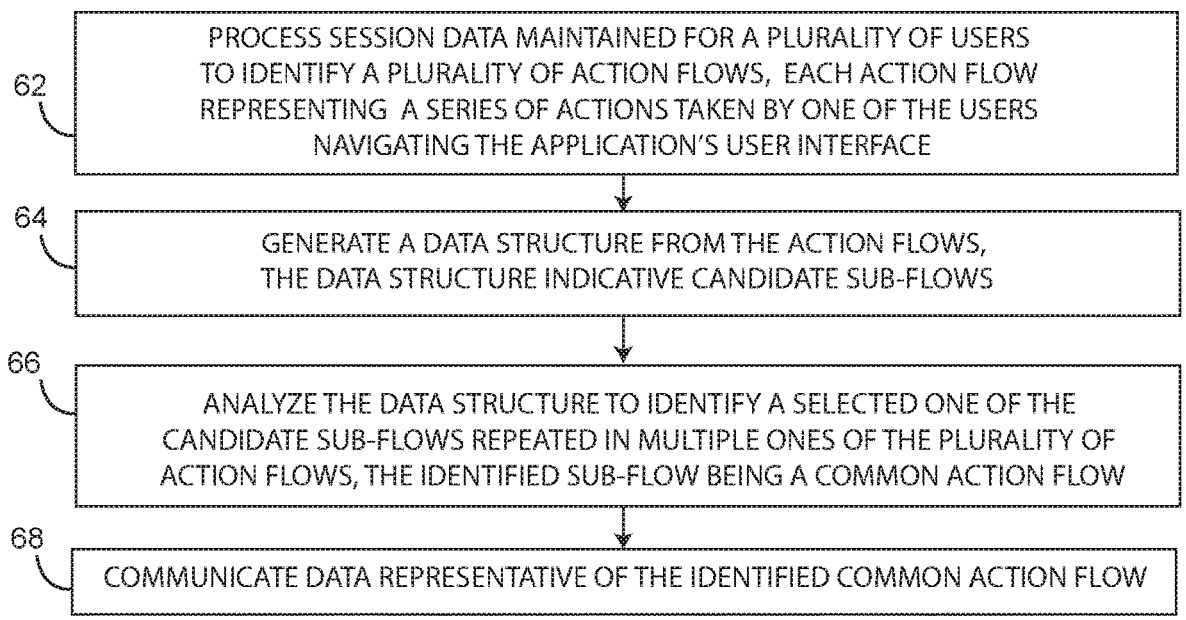
FIG. 5 is a flow diagram depicting steps taken to implement an example.

Operation:

FIG. 5 is a flow diagram of steps taken to implement a method for managing a sensory factor. In discussing FIG. 5, reference may be made to components depicted in FIGS. 1-4. Such reference is made to provide contextual examples and not to limit the manner in which the method depicted by FIG. 5 may be implemented.

Session data maintained for a plurality of users is processed to identify a plurality of action flows (step 62). Each action flow represents a series of actions taken by one of the users navigating an application's user interface during a given session. Each action flow may be represented as a character string with each character representing an action. Referring back to FIG. 2, session engine 36 may be responsible for implementing step 62.

A data structure is generated from the plurality of action flows (step 64). The data structure is indicative of a plurality of candidate sub-flows. The data structure may be a generalized suffix tree where each suffix in the tree represents a different sub-flow of actions included in the plurality of action flows identified in step 62. Thus, each suffix or suffix sub-flow represents a candidate sub-flow of actions. The data structure is analyzed to identify a selected one of the candidate sub-flows repeated in multiple ones of the plurality of action flows (step 66). The identified sub-flow is a common action flow. Flow engine 38, shown in FIG. 2, may be responsible for implementing steps 64 and 66.

Data representative of the identified common action flow is communicated (step 68). Step 68 may include communicating the data electronically, storing the data in a repository for later retrieval, of causing a graphical display of the data on a screen. Referring to FIG. 2, step 68 may be implemented by reporting engine 40.

In one example, each of the plurality of candidate sub-flows of the data structure generated in step 64 may be a consecutive series of actions. In another example, each sub-flow may represent a sequence of actions that are interrupted by other actions. In the latter case, the method can include filtering the plurality of identified action flows to include only those actions included in a set of statistically related actions. In the example of FIG. 2, session engine 36 may be responsible for filtering. Step 64 then includes generating the data structure from the filtered plurality of action flows such that the data structure is indicative of the plurality of candidate sub-flows of non-consecutive actions.

Analyzing, in step 66 can include filtering the plurality of candidate sub-flows according to a rule such that the sub-flow of actions representing the common action flow remains. That rule can specify at least one of a flow length and a repetition count such that candidate sub-flows shorter than a predetermined length or repeated fewer than a specified number of times are removed from consideration.

Analyzing in step 66 can include filtering the plurality of candidate sub-flows according to a rule specifying at least one of a repetition count and a flow length to reveal a given sub-flow and then identifying, from the plurality of candidate sub-flows, an extension of the given sub-flow. At least one of the given sub-flow and the extension can then be identified as the sub-flow of actions representing the common action flow.

CONCLUSION

FIGS. 1-4 aid in depicting the architecture, functionality, and operation of various embodiments. In particular, FIGS. 1-4 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 5 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. An apparatus comprising:

a processor; and a non-transitory computer readable medium on which is stored instructions that cause the processor to:

identify, for an application, a plurality of action flows that each represents a series of user actions in navigating a user interface of the application, wherein each of the plurality of action flows includes a respective sub-flow of actions;

determine a sub-flow of actions in the plurality of action flows that meets a repetition count rule, the determined sub-flow of actions representing a common action flow;

represent each of the sub-flows of actions by a respective character string with each character in the respective character string representing a user action in navigating the user interface, wherein the repetition count rule corresponds to a minimum number of times a character string of a sub-flow of actions is repeated among the sub-flows of actions and wherein the determined sub-flow of actions comprises a sub-flow of actions that includes a character string that meets the repetition count rule; and cause data representative of the common action flow to be outputted.

2. The apparatus of claim 1, wherein the instructions further cause the processor to:

determine a set of candidate action flows from the plurality of action flows that have sub-flows of actions that are longer than a specified length; and determine the sub-flow of actions that meets the repetition count rule from the determined set of candidate action flows.

3. The apparatus of claim 2, wherein the instructions further cause the processor to:

use a respective set of the character strings to represent each of the plurality of action flows; and use sets character of strings to generate a suffix tree data structure, each suffix in the suffix tree data structure representing a different sub-flow of actions in the plurality of action flows.

4. The apparatus of claim 3, wherein the instructions further cause the processor to:

determine the sub-flow of actions that meets the repetition count rule from the sets of character strings in the suffix tree data structure.

5. The apparatus of claim 4, wherein the instructions further cause the processor to:

identify an extension of the suffix representing the sub-flow of actions that meets the repetition count rule; and determine the suffix representing the sub-flow of actions and the identified extension as the common action flow.

6. The apparatus of claim 1, wherein each character in the respective character string represents a user action in navigating the user interface.

7. The apparatus of claim 1, wherein the instructions further cause the processor to:

filter the plurality of action flows to include actions in a set of statistically related actions;

identify a set of candidate sub-flows of non-consecutive actions from the filtered plurality of action flows; and filter the identified set of candidate sub-flows of non-consecutive actions such that the sub-flow of actions representing the common action flow remains.

8. The apparatus of claim 1, wherein the instructions further cause the processor to:

generate a script for testing the application from the common action flow.

9. The apparatus of claim 1, wherein the instructions further cause the processor to:

track user actions in navigating the user interface to determine the plurality of action flows.

10. A method comprising:

identifying, by a processor, user interactions with a user interface of an application;

identifying, by the processor, a plurality of action flows that each represents a series of user actions in navigating the user interface of the application, each of the plurality of action flows including a respective sub-flow of actions;

determining, by the processor, a sub-flow of actions that meets a specified rule, the determined sub-flow of actions representing a common action flow of the plurality of action flows;

representing each of the sub-flows of actions by a respective character string with each character in the respective character string representing a user action in navigating the user interface, wherein the specified rule comprises a length rule corresponding to a minimum length of the character string and wherein determining the sub-flow of actions further comprises determining a sub-flow of actions that includes a character string that meets the length rule; and outputting, by the processor, data representative of the common action flow of the plurality of action flows.

11. The method of claim 10, further comprising:

generating a test script for testing the application from the common action flow.

12. The method of claim 10, further comprising:

using a set of the character strings to represent each of the plurality of action flows; and using sets of character strings to generate a suffix tree data structure, each suffix in the suffix tree data structure representing a different sub-flow of actions in the plurality of action flows.

13. The method of claim 10, further comprising:

filtering the plurality of action flows to include actions in a set of statistically related actions;

identifying a set of candidate sub-flows of non-consecutive actions from the filtered plurality of action flows; and filtering the identified set of candidate sub-flows of non-consecutive actions such that the sub-flow of actions representing the common action flow remains.

14. The method of claim 10, wherein each character in the character string represents a user action in navigating the user interface.

15. The method of claim 10, further comprising:

tracking user actions in navigating the user interface to determine the plurality of action flows.

16. A non-transitory computer readable medium on which is stored machine readable instructions that when executed by a processor, cause the processor to:

identify a plurality of action flows that each represents a series of user actions in navigating a user interface of an application, each of the plurality of action flows including a respective sub-flow of actions;

filter the identified plurality of action flows to include actions in a set of statistically related actions;

identify a set of candidate sub-flows of non-consecutive actions from the filtered plurality of action flows;

filter the identified set of candidate sub-flows of non-consecutive actions according to a specified rule such that the sub-flow of actions representing a common action flow remains; and generate a test script for testing the application from the common action flow.

17. The non-transitory computer readable medium of claim 16, wherein the instructions further cause the processor to:

represent each of the sub-flows of actions by a respective character string with each character in the respective character string representing a user action in navigating the user interface.

18. The non-transitory computer readable medium of claim 17, wherein the specified rule comprises a repetition count rule corresponding to a minimum number of times a character string of a sub-flow of actions is repeated among the sub-flows of actions, and wherein the instructions further cause the processor to:

determine the sub-flow of actions that includes a character string that meets the repetition count rule as representing the common action flow.

19. The non-transitory computer readable medium of claim 17, wherein the specified rule comprises a length rule corresponding to a minimum length of the character string and wherein the instructions further cause the processor to:

determine a sub-flow of actions that includes a character string that meets the length rule as representing the common action flow.

20. The non-transitory computer readable medium of claim 17, wherein the instructions are further to cause the processor to:

use a set of the character strings to represent each of the plurality of action flows; and use sets of strings to generate a suffix tree data structure, each suffix in the suffix tree data structure representing a different sub-flow of actions in the plurality of action flows.

\* \* \* \* \*